Patented Sept. 21, 1943

2,330,140

UNITED STATES PATENT OFFICE 2,330,140

PROCESS OF RECOVERING STEROLIC MATERIAL

Elmer B. Oberg and Albert W. Kleinsmith, Decatur, Ind., assignors to Central Soya Company, Inc., Fort Wayne, Ind., a corporation of Indiana No Drawing. Application April 6, 1942, Serial No. 437,830

11 Claims. (Cl. 260—397.2)

Our invention relates to the recovery of sterolic material from sterol-containing fatty substances, such as sterol-containing vegetable fats and animal fats and products derived from such fats, and more especially to the recovery of sterolic material from the refining foots obtained following alkali refining of such fats.

Most fatty substances, as is well known, contain relatively small amounts of unsaponifiable matter; which unsaponifiable matter includes any sterols present. Among such fatty substances which contain sterols in the unsaponifiable fraction are various vegetable oils, such for instance as soybean oil, corn oil, cocoanut oil, cottonseed oil, wheat-germ oil, peanut oil, tall oil, and palm oil, and some animal fats, such for instance as spinal cord, brain, fish oils, and wool fat—to mention but a few. Important among these, from the standpoint of commercial availability as sources of sterolic material, are soybean oil, tall oil, wool fat, and the spinal cords of animals.

The unsaponifiable matter contained in such sterol-containing fatty substances consists largely of pigments, long-chain alcohols, ketones, and sterols. The sterols are high-molecular-weight monohydric alcohols, usually unsaturated, and of a crystalline nature when pure.

In the alkali refining of oils by the usual methods, alkaline soaps are produced, and when these are separated they contain a large portion of the unsaponifiable matter. In such alkali refining, the crude oil, most commonly a vegetable oil, is treated with a lye solution, the amount of lye used being determined by the amount of free fatty acids, "break" material, etc., in the oil; the mixture so produced is stirred, and usually warmed; and then the mixture is allowed to cool, and certain insoluble material is separated, as by settling or centrifuging, to leave a supernatant relatively clear oil. The part that is thus separated includes the alkaline soaps, or refining foots as they are frequently called; which, as stated, retain a large part of the unsaponifiable matter, including sterolic material.

The refining foots thus separated contain a large percentage of water (usually between 50% and 60%), and the actual soaps themselves; and in addition some partly saponified fats, free oil, gums, and the unsaponifiable matter already referred to, all in relatively small percentages. The partly saponified fats and the free oil may be referred to collectively as "fatty material."

The sterolic material in the refining foots is valuable. To recover it from the refining foots, however, is a difficult problem. If it is attempted to extract that unsaponifiable fraction, including the sterolic material, without any prior treatment of the refining foots (as with a hot sterol solvent such as hot petroleum ether), emulsions are produced which are difficult to break. That difficulty may to some extent be overcome by saponifying the fatty material remaining in the refining foots before attempting the extraction of the unsaponifiable fraction with a sterol solvent, as with petroleum ether; but there still remains the difficulty of getting an efficient extraction, and that difficulty has been sufficient to make this procedure generally unsatisfactory. The emulsion difficulty may also be reduced by saponifying the fatty material remaining in the refining foots, then drying the whole mass, and then extracting with a sterol solvent; but here again the extraction procedure is so inefficient that the yield is very low.

The difficulty of extraction in both of these procedures which involve saponification of the fatty material remaining in the refining foots is due, we believe, to the inability of the sterol solvent to get into intimate contact with the unsaponifiable matter, whether or not drying follows the saponification.

We have found that we can get an efficient extraction, and a good yield of sterolic material, if after the saponification of the fatty material in the refining foots we greatly increase its volume by producing a solid foam of it, and conduct the sterol extraction on that solid foam. That solid foam must have considerable permanency and structural stability; for otherwise it collapses and packs, and the yields from the extraction are poor. The important thing is that the alkaline soaps to be extracted be in the form of a solid foam, so that it is porous and is thus intimately penetrable by the extracting solvent; and that the solid foam be free of moisture and of fatty material that is not fully saponified. Any moisture or incompletely saponified fats lead to emulsions and to foaming in the extracting step.

To get a solid foam, we treat the refining foots with a soluble silicate, desirably an alkali-metal silicate and most conveniently sodium silicate (water glass) or sodium metasilicate, under strongly alkaline conditions, as by having some sodium hydroxide present; stir the whole to produce a foam; and dry that foam to produce a solid foam. This solid foam is a dry porous product, of considerable permanency and structural stability; and remains relatively porous and uncollapsed and unpacked when it comes in contact with a sterol solvent. The silicate in the solid foam not only furnishes the necessary structural stability, but also makes for easy drying to produce the solid foam; for while solid foams of a sort can be produced without the use of a silicate—as by using sodium hydroxide or potassium hydroxide alone—they not only lack the necessary permanency and structural stability while being extracted, but are difficult (and frequently impossible) to get thoroughly dried, even after prolonged drying.

This solid foam, conveniently after being cut or broken into small pieces, is extracted with a suitable sterol solvent, as in a Soxhlet-type extracting apparatus. The extracting solvent may be any solvent which when hot dissolves sterols. Among such solvents may be mentioned petroleum ether, such as the so-called 'Skellysolve B' boiling at 60–70° C., hexane, ethyl ether, benzene, trichloroethylene, etc.

The sterol-containing extract obtained may be suitably treated, in known manner, to obtain sterolic material therefrom. Conveniently the extract is first filtered hot, as through a steam-jacketed funnel, to remove any solid foreign material which may be present; then it is subjected to evaporation, to drive off the solvent and leave the sterolic material (the whole unsaponifiable fraction) as a residue; this residue is taken up in warm alcohol, and the solution so obtained is cooled to permit the sterols to crystallize, in fairly pure form; and these sterols may be further purified by recrystallization, as from hot ethyl or isopropyl alcohol.

The following is an illustration of our process:

*Example 1.*—We weigh into a suitable bowl about 13 lbs. of alkali refining foots as obtained in refining soybean oil, whether extracted or expressed oil, and place it in a steam bath. We add about 1.3 lbs. (the amount need not be precise) of technical sodium metasilicate, (or about its equivalent of water glass), and about 0.4 lb. of flake sodium hydroxide. The whole is warmed, and stirred frequently, until the temperature reaches about 140° F., at which temperature it is held for several hours. After about four to six hours at this temperature the saponification of any fatty material present is effectively accomplished. Then the mixture is cooled to about 80° F. After it is cooled, it is stirred rapidly in a suitable mixer, conveniently a spindle-type mixer, to whip the whole into a foam. It is necessary to cool in order to get good foaming. With good foaming, the volume is increased to about four times the original volume.

The foam thus produced is poured into trays, and is then dried at about 150–160° F. This leaves a dry crisp material, which is a solid foam.

This solid foam is cut or broken into fairly small pieces. The pieces are placed in a suitable extraction apparatus, as of the Soxhlet type, and extracted with the chosen sterol solvent. We prefer petroleum ether—such as the so-called 'Skellysolve B,' which boils in the range of 60–70° C. Effective extraction requires several hours, and it is convenient to continue it overnight. The extract is then filtered hot; and then subjected to evaporation, as on a steam bath, to drive off the solvent and to leave behind the unsaponifiable residue, which is largely sterolic in character. This residue is taken up in hot alcohol, and the alcoholic solution is allowed to cool; whereupon the sterols crystallize, and are suitably removed as by decanting or filtering.

In this way we obtain yields of 3% to 4% of recrystallized sterols from soya oil refining foots —based on a comparison by weight with the solid foam.

*Example 2.*—The procedure of Example 1 is repeated on corn oil refining foots; in which case the yield is about 2% of recrystallized sterols, compared on a weight basis with the solid foam.

*Example 3.*—The procedure of Example 1 is repeated on cocoanut oil refining foots; in which case the yield is much smaller, of the order of 0.25%, compared on a weight basis with the solid foam.

*Example 4.*—Instead of using sterol-containing fatty substances of vegetable origin, as in Examples 1, 2, and 3, we may use sterol-containing fatty substances of animal origin as our starting material.

As one such instance, we may use brain or spinal cord of animals. This material, which when undried contains about 50% moisture, is treated with sodium hydroxide and sodium metasilicate, and the resulting mixture is heated and stirred for several hours at about 140° F. This saponifies the bulk of the fatty material (substantially all of it that will saponify) and hydrolyzes the protein contained therein. The resulting product, consisting largely of the sodium salts of fatty and amino acids together with unsaponifiable matter, is then treated according to the procedure set forth in Example 1; to produce a solid foam, and to obtain sterols from that solid foam. Generally it is necessary to use more sodium hydroxide with brain or spinal cord than with soybean refining foots, and a convenient proportion is about one pound of flake sodium hydroxide and about one pound of sodium silicate to ten pounds of the undried brain or spinal material.

The sterols obtained from such brain or spinal cord consist largely of cholesterol.

A yield of 7.0% sterols, after two crystallizations from alcohol, has been obtained. This percentage is based on the dried silicate soaps. By recrystallizing from alcohol a good separation from non-sterolic material, probably phosphatide, is accomplished.

*Example 5.*—As another instance of a non-vegetable source, we may use foots from a refined fish oil. These foots from fish oil are treated in substantially the same way as are the refining foots from soybean oil in Example 1 above; save that six pounds of fish oil foots require about 0.8 pound of sodium hydroxide and about 0.6 pound of sodium metasilicate. A yield of 1.25% of sterols was obtained, based on the dried silicate soaps.

In all these examples, but especially in any of Examples 1, 2, and 3, the petroleum ether takes up from the solid foam not only the sterols but some other unsaponifiable material, frequently including red and yellow pigments. The sterols are largely freed from these pigments by crystallization from hot alcohol or petroleum ether; and by repeating the recrystallization several times the pigments are usually substantially all removed. Instead of removing the color by recrystallization from alcohol or petroleum ether, that color may be largely or wholly destroyed by exposing the unextracted refining foots, either before or after they have been made into a solid foam, to ultra-violet light or to sunlight; which is sometimes cheaper and is always rather simpler than the recrystallization procedure.

We claim as our invention:

1. The process of recovering sterolic material from sterol-containing fatty material, which consists in subjecting said fatty material to saponification under alkaline conditions in the presence of a soluble silicate, expanding the resultant mass into a foam, drying that foam to produce a solid foam, and extracting sterolic material from that solid foam.

2. The process of recovering sterolic material from sterol-containing fatty material as set forth in claim 1, with the addition that the soluble silicate is an alkali-metal silicate.

3. The process of recovering unsaponifiable material from fatty material containing it, which consists in subjecting said fatty material to saponification under alkaline conditions in the presence of a soluble silicate, expanding the resultant mass into a foam, drying that foam to produce a solid foam, and extracting unsaponifiable material from that solid foam.

4. The process of recovering unsaponifiable material from fatty material containing it as set forth in claim 3, with the addition that the soluble silicate is an alkali-metal silicate.

5. The process of recovering sterolic material from refining foots resulting from the alkali refining of oils, which consists in subjecting said refining foots to saponification under alkaline conditions in the presence of a soluble silicate, expanding the resultant mass into a foam, drying that foam to produce a solid foam, and extracting sterolic material from that solid foam.

6. The process of recovering sterolic material from refining foots resulting from the alkali refining of oils as set forth in claim 5, with the addition that the soluble silicate is an alkali-metal silicate.

7. The process of recovering sterolic material from refining foots resulting from the alkali refining of oils as set forth in claim 5, with the addition that the refining foots are those obtained in the alkali refining of a vegetable oil.

8. The process of recovering sterolic material from refining foots resulting from the alkali refining of oils as set forth in claim 5, with the addition that the refining foots are those obtained in the alkali refining of soybean oil.

9. The process of recovering sterolic material from refining foots resulting from the alkali refining of oils as set forth in claim 5, with the addition that the refining foots are those obtained in the alkali refining of animal oil.

10. The process of recovering sterolic material from sterol-containing fatty material as set forth in claim 1, with the addition that the fatty material is of vegetable origin.

11. The process of recovering sterolic material from sterol-containing fatty material as set forth in claim 1, with the addition that the fatty material is of animal origin.

ELMER B. OBERG.
ALBERT W. KLEINSMITH.